(12) United States Patent
Smithson

(10) Patent No.: US 8,695,085 B2
(45) Date of Patent: Apr. 8, 2014

(54) SELF-PROTECTING STORAGE

(75) Inventor: Brian Smithson, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 603 days.

(21) Appl. No.: 12/351,769

(22) Filed: Jan. 9, 2009

(65) Prior Publication Data

US 2010/0180335 A1 Jul. 15, 2010

(51) Int. Cl.
| | | |
|---|---|---|
| G06F 7/04 | (2006.01) | |
| G06F 12/00 | (2006.01) | |
| G06F 12/14 | (2006.01) | |
| G06F 13/00 | (2006.01) | |
| G06F 17/30 | (2006.01) | |
| G11C 7/00 | (2006.01) | |
| G06F 1/26 | (2006.01) | |
| G06F 11/00 | (2006.01) | |
| G08B 13/00 | (2006.01) | |
| G08B 21/00 | (2006.01) | |
| G08B 29/00 | (2006.01) | |

(52) U.S. Cl.
USPC ........ 726/18; 726/2; 726/16; 726/17; 726/26; 726/27; 726/34; 726/35

(58) Field of Classification Search
USPC .......................... 726/2, 16–19, 26–27, 34–35
See application file for complete search history.

(56) References Cited

U.S. PATENT DOCUMENTS

| | | | | |
|---|---|---|---|---|
| 6,567,919 | B1 * | 5/2003 | Yanagihara et al. | 726/7 |
| 7,069,447 | B1 * | 6/2006 | Corder | 713/189 |
| 7,350,022 | B2 * | 3/2008 | Mizuno et al. | 711/112 |
| 7,743,241 | B1 * | 6/2010 | Moore | 713/2 |
| 2003/0212871 | A1 * | 11/2003 | Suzuki et al. | 711/164 |
| 2007/0101434 | A1 * | 5/2007 | Jevans | 726/26 |

OTHER PUBLICATIONS

Seagate Technology Inc., "Medalist 2132 ATA Interface Drive Product Manual," Jan. 1997, 3 pages.*
I See 0xDead Disks website, www.wordpress.com, Jan. 2008, 5 pages.*

* cited by examiner

*Primary Examiner* — Carl Colin
*Assistant Examiner* — John Elmore
(74) *Attorney, Agent, or Firm* — Hickman Palermo Truong Becker Bingham Wong LLP; Edward A. Becker

(57) ABSTRACT

A method and apparatus for managing passwords for accessing data in a storage is provided. The method comprises generating and storing a password, generating and providing to the storage a request to access data in response to receiving a first request to access data in the storage, retrieving and providing the password to the storage in response to the request for a password. The apparatus comprises an initialization module and a storage access module. The initialization module is configured to generate and store a password. The storage access module is configured to generate and provide a request to access data in response to receiving a first request to access data in the storage, receive a request for a password, retrieve the password in response to the request for a password, and provide the password to the storage to obtain access to the data in the storage.

20 Claims, 11 Drawing Sheets

SELF-PROTECTING STORAGE

FIELD OF THE INVENTION

The present invention relates to managing passwords for accessing data in a secure storage.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Storages and Host Systems

Data may be stored in storage devices. Example storage devices for storing data include hard disk drives and flash memory cards that are used in electronic devices. Example electronic devices that use such storage devices include, but are not limited to, a printer, a copier, a server, a computer, storage appliance, computer networking device, digital camera, mobile telephone, point-of-sale equipment, other office equipment, or a multi-function peripheral. A multi-function peripheral is a device that provides multiple functions, such as a printer function, a fax function, a scan function, a copy function, an archive function, and a GPS function. Such electronic devices are part of a group of devices referred to herein as host systems. Host systems can be any kind of device that might communicate with, or interact with, storage devices. To protect data stored in such storage devices, a password might be used as a method of access control, for accessing the data stored in such storage devices or to write data into such storage devices. A storage device may simply be referred to hereinafter as "storage".

Passwords

A password is any data used for verification or authentication. Passwords are often used to protect data from unauthorized access. Passwords are also used to allow authorized parties access to data. A party protects data by utilizing a security mechanism which allows the party to establish a password, and only those that provide the established password to the security mechanism may access the data. Thus, a second party seeking to access the data is verified or authenticated by providing the password. If the password provided by the second party is not the established password, then the second party is denied access to the data.

A password can be any combination of alphanumeric characters or other symbols. A password might not have any meaning. For example, a password might be "% j3fsad;". However, a password might have meaning by representing biometric data, or any other meaningful data. For example, a password might describe the patterns of a person's fingerprint. A password might also be an answer to a security question. For example, a password might be "Smith" in response to a security question "What is your mother's maiden name?" Also, for example, a password might be "three circles" in response to a security question "What does this picture show?" A password might be dynamically generated. For example, a security mechanism might require, in order to grant access to the sensitive data, a password that is generated and changed every 24 hours. A password can be of any length, and a password can also be a combination of other passwords. For example, a password can be a combination of the passwords "@#$af" and "0123d,921". A password might have no meaningful measurable length or any other meaningful dimensions. For example, the password might be a picture. A password might be based in hardware or software. For example, the password might be an electrical signal or a pointer to a memory location.

Data Security

A data security mechanism may require a username and password as a form of access control to sensitive data stored on a storage of a host system. The Advanced Technology Attachment standard ("ATA standard"), for example, provides a built-in password security mechanism ("ATA security") for storages that adhere to the ATA standard. This ATA standard can help protect data from unauthorized access, for example when the storage is removed and moved to an unsecure system. Without the password, data cannot be read from the storage whether or not the storage is moved to an unsecure system. Data may be stored in the storage unencrypted, or in some implementations built-in hardware in the storage may provide encryption to protect the data. Together, these levels of protection in the storage protect the data in the storage in case someone attempts to access the data in the storage without authorization.

Typical implementations of ATA security require the user to establish a password, and require the user enter the password each time the host system is powered up. However, the user must create, store, and manage a password. A master password may also be required in case the user loses their password. Requiring the user to manage passwords is a clumsy and inefficient approach that is prone to errors.

Based on the foregoing, there is a need for automatically managing the generation, storage, and application of passwords for secure storage.

SUMMARY

Techniques are provided as a method and apparatus for automatically managing the generation, storage, and application of passwords for access control to storages. A method for managing passwords for accessing data in a storage comprises generating a first password and storing the first password at a first location in a nonvolatile storage that is separate from the storage. In response to receiving a first request to access data in the storage, generating and providing to the storage a second request to access the data. Receiving, from the storage, a request for a password, and in response to the request for the password: retrieving, from the nonvolatile storage that is separate from the storage, a first password, and providing the first password to the storage to obtain access to the data in the storage.

An apparatus for managing passwords for accessing data in a storage comprises: A) an initialization module configured to generate a first password, and store the first password at a first location in a nonvolatile storage that is separate from the storage, and B) a storage access module configured to 1) generate and provide to the storage a second request to access data, in response to receiving a first request to access the data in the storage; 2) receive, from the storage, a request for a password; 3) retrieve, from the nonvolatile storage that is separate from the storage, a first password, in response to the request for the password, and 4) provide the first password to the storage to obtain access to the data in the storage.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
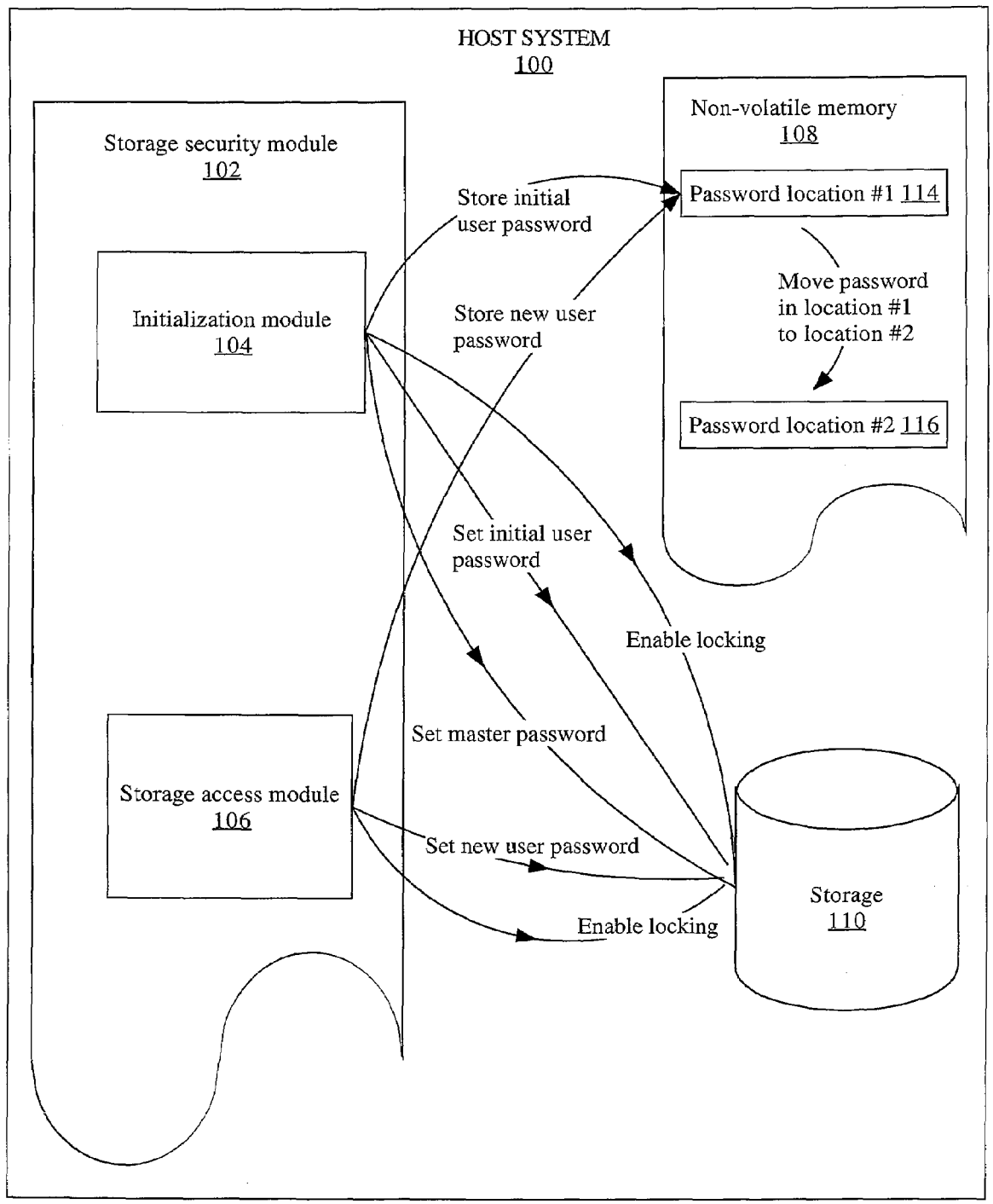
FIG. 1 is a block diagram depicting an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for managing passwords used to access data on a storage. In an embodiment of the invention, an initialization module initially generates and stores a password for future use. The initialization module "enables locking" on the storage device so that, upon a power cycle or reset, the storage device will "lock" by thereafter not allowing access to data on the storage unless the storage receives the generated password. In some embodiments, the storage also locks when the user logs off. In certain embodiments, other events may cause the storage to lock.

When a user requests access to data on the storage, a storage access module automatically retrieves the generated password, as necessary, to "unlock" the storage to gain access to data stored in the storage. In some embodiments of the invention, the storage access module generates a new password each time an unlock operation is successful, and lock the storage using the new password. Thus, in such embodiments, the storage locks with a new password each time the storage is locked, and the storage access module attempts to unlock the storage with the new password first, and failing that, try the most previously used password. In other embodiments of the invention, the storage does not always change the password each time the storage is relocked.

In an embodiment of the invention, if the storage access module cannot successfully unlock the storage using passwords that were previously generated and stored, the storage access module may provide to the storage a master password. If the storage is in a NORMAL security mode, the storage will then allow access to data in the storage and reset the password used to unlock the storage. If the storage is in a MAXIMUM security mode, however, then the storage will allow a reset of the password used to unlock the storage but will erase the data contained within the storage. Under the ATA standard, the NORMAL security mode is known as HIGH SECURITY mode, and the MAXIMUM security mode is known as MAX SECURITY mode.

In some embodiments of the invention, the security mode of the storage is the same as the security mode of the host system that the storage is connected to. For example, a host system such as a printer may also have a MAXIMUM and a NORMAL security mode, and the security mode of the storage may match the security mode of the host system. An administrator of the host system may initially choose the security mode and set the security mode on the storage device and host system. In other embodiments of the invention, the security mode of the storage is not the same as the security mode of the host system that the storage is connected to. In some embodiments, the security mode may switch from MAXIMUM to NORMAL security. In certain embodiments, the security mode of the storage is preset by the vendor. If there are multiple storages in a host system, each storage may be set to a different security mode.

Example System Architecture

FIG. 1 is a block diagram depicting an overview of an embodiment of the invention. FIG. 1 depicts the different components and various interactions between the different components, although FIG. 1 does not show the timing of the various interactions. FIG. 1 does not show all possible interactions between the components depicted in FIG. 1. FIG. 1 is only a block diagram overview, and more details on storing and setting the various passwords and enabling locking are provided in different sections of this specification.

FIG. 1 depicts a host system 100 upon which an embodiment of the invention may be implemented. Host system 100 may be any device that interacts with, or communicates with, a storage. Host system 100 may be any device such as, but is not limited to, a printer, a copier, a server, a computer, storage appliance, computer networking device, digital camera, mobile telephone, point-of-sale equipment, other office equipment, or a multi-function peripheral. In some embodiments, host systems include more than just electronic devices. Host system 100 need not be an electronic device, but might be a mechanical device, or any combination of electronic and mechanical device, or any other type of device.

In FIG. 1, host system 100 includes a storage security module 102 that includes two separate modules, an initialization module 104, and a storage access module 106. Storage security module 102, initialization module 104, and storage access module 106 are executable modules that together manages the creation, storage, and management of passwords. In some embodiments, initialization module 104 and storage access module 106 are implemented by modifying existing modules in host system 100. For example, initialization module 104 might also perform normal initialization procedures during power up of host system 100. Storage access module 106 might be a modified version of a disk driver or disk controller of host system 100.

Host system 100 also includes a non-volatile memory 108 and storage 110. In some embodiments, non-volatile memory 108 or storage 110 or both are not part of host system 100 but may send and receive information to and from host system 100. In some embodiments, non-volatile memory 108 stores passwords using memory space that is rewritable. Non-volatile memory 108 and storage 110 might be implemented using flash or hard drive technologies, or any other technology that allows for storage of data. In some embodiments, either non-volatile memory 108 or storage 110 or both might be implemented using volatile media or non-volatile media.

Non-volatile memory 108 receives instructions and data from initialization module 104 and storage access module 106 to store one or more passwords. As depicted in FIG. 1, initialization module 104 stores two passwords in two password locations, a password location #1 114, and a password location #2 116. In some embodiments, non-volatile memory 108 might also move a password stored in password location #1 114 to password location #2 116, in response to instructions from storage access module 106.

Storage 110 receives instructions and data from initialization module 104 and storage access module 106 to store data. The data stored in storage 110 is stored in a secure manner, with access control security. In some embodiments, storage 110 also provides data encryption security. As part of the access control security of storage 110, storage 110 only allows entities with authorization to access data stored in storage 110. Storage 110 requires an access password prior to providing access to data stored in storage 110, as will be discussed in detail in other parts of this specification.

Storage 110 may be a volatile or non-volatile storage medium. Storage 110 might be part of host system 100. In some embodiments, storage 110 is not part of host system 100 but might communicate with, or interact with, host system 100. FIG. 1 depicts storage 110 as part of host system 100 only as an example, storage 110 need not be part of host system 100. Host system 100 might communicate or interact with storage 110 remotely. For example, such communication or interaction might be performed over a network.

Storage 110 might be, for example, a Redundant Array of Independent Disks (RAID) storage, or a portable storage medium, or a non-portable storage medium. In some embodiments, storage 110 might be a read-only medium supporting only read operations. In some embodiments, storage 110 might be a write-only medium supporting only write operations. Storage 110 might be a single storage of a plurality of storages, each of which might connect to, or communicate with, or interact with, host system 100.

In some embodiments, the functionality of initialization module 104 and storage access module 106 are implemented in a single module, such as storage security module 102, instead of two separate modules. In other embodiments, the functionality of initialization module 104 and storage access module 106 is divided into multiple modules in implementation. The functionality of initialization module 104 and storage access module 106 might be implemented in computer hardware, computer software, or any combination of computer hardware or computer software. For example, the functionality may be part of hardware controllers for accessing storage 110, or part of storage access routines in an operating system, or part of the kernel of an operating system, or part of power-up initializations performed by an operating system.

According to FIG. 1, initialization module 104 interacts with non-volatile memory 108 and storage 110 to store passwords, set passwords, and enable locking. Initialization module 104 stores an initial user password in non-volatile memory 108 at password location #1 114. Initialization module 104 sets initial user password at storage 110. Initialization module 104 sets master password at storage 110. In some embodiments, initialization module 104 also stores the initial user password at password location #2 116. When initialization module 104 "sets" an initial user password at storage 110, storage 110 accepts and saves the initial user password as a password that will unlock storage 110.

Initialization module 104 communicates with storage 110 to enable locking of storage 110. Once locking is enabled on storage 110, then upon the reset or power cycle of storage 110, storage 110 will lock. When locked, storage 110 will request a password prior to granting access to the contents of storage 110. Under the ATA standard, storage access module 106 enables locking on storage 110 by setting a SECURITY FREEZE LOCK setting on storage 110. SECURITY FREEZE LOCK is the setting name used in the ATA standard. Other standards might use a similar setting by a different name to perform a similar function.

According to FIG. 1, storage access module 106 also interacts with non-volatile memory 108 and storage 110 to store passwords, set passwords, and enable locking. However, as noted earlier, timing of interactions is not shown in FIG. 1. Storage access module 106 stores a new user password at password location #1 114. Storage access module 106 sets new user password at storage 110. Storage access module 106 enables locking at storage 110. Storage access module 106 causes the password stored in password location #1 114 to be moved to password location #2 116. In certain embodiments, the password stored in password location #1 114 is copied to password location #2 116. When storage access module 106 "sets" a new user password at storage 110, storage 110 accepts and saves the new user password as a password that will unlock storage 110.

In some embodiments, non-volatile memory 108 is located on a controller board on the host system 100. In other embodiments, non-volatile memory 108 is located on the main memory of host system 100. In certain embodiments, non-volatile memory 108 is a portable storage unit. In certain embodiments, non-volatile memory 108 is a non-portable storage unit.

In some embodiments of the invention, storage 110 uses not only access control security, but storage 110 also uses encryption technologies for protecting data in storage 110. In such embodiments, storage security module 102 might manage and store a key that can be used to decrypt data read from storage 110, or a key that can be used to encrypt data written to storage 110. Such a key might be stored at nonvolatile data memory 108, or may be stored in a portable storage medium. In some embodiments, storage access module 106 manages and stores the key that can be used to decrypt data read from storage 110.

The techniques presented herein may be adapted with minor modifications to create, store, manage, or provide encryption and decryption keys that may be used for encryption and decryption of data in storage 110. In some embodiments, such modifications might include, for example, not performing the steps of FIG. 4 and FIG. 6, and using only one password instead of two. Encryption and decryption keys may be created, stored, managed, and provided to storage 110 in a similar manner as passwords are created, stored, managed, and provided to storage 110. In some embodiments, the encryption and decryption keys may be the passwords described herein.

Flow Overview

Figure 2:
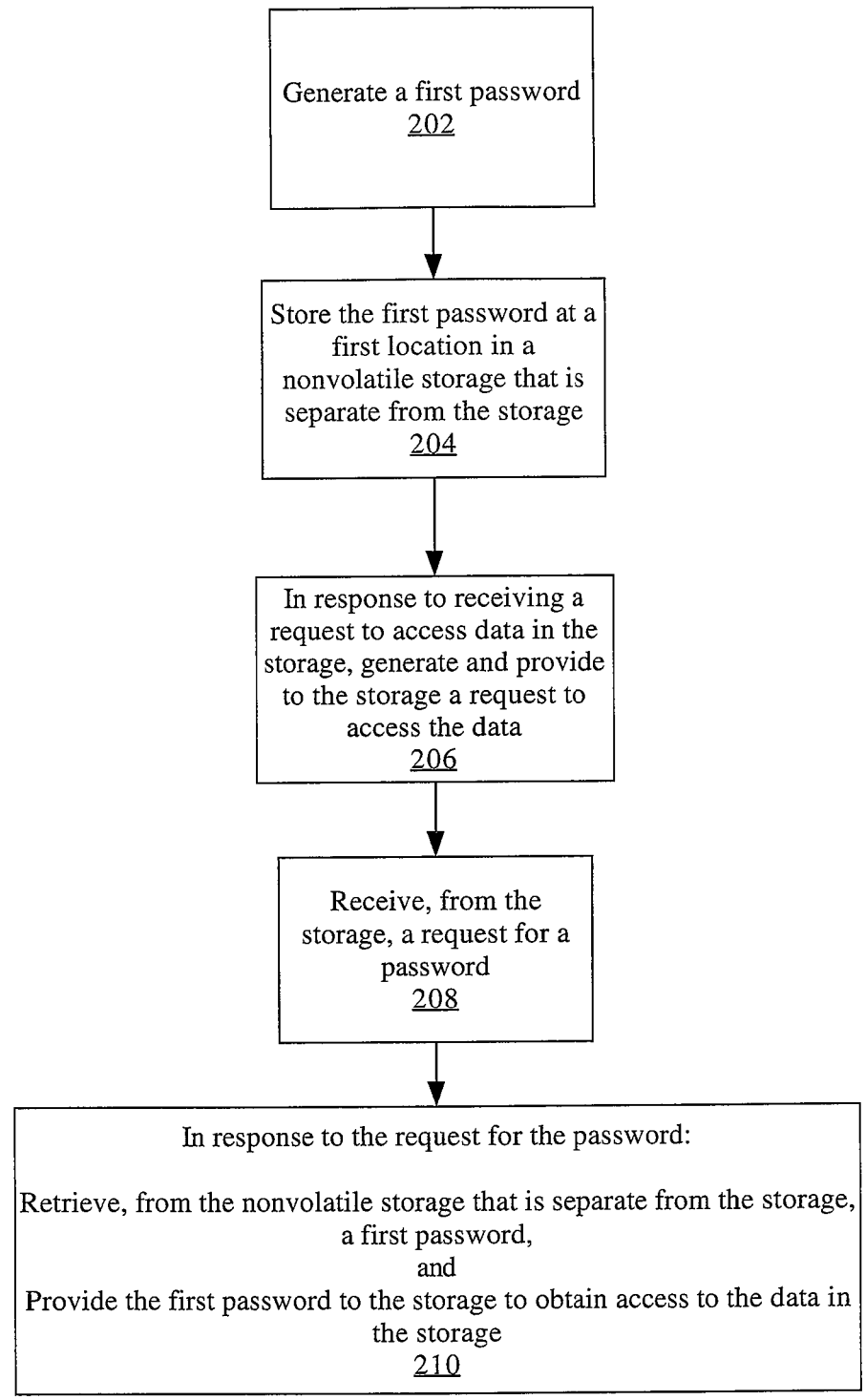
FIG. 2 is a flow diagram depicting a technique for generating and managing passwords, according to an embodiment of the invention.

FIG. 2 is a flow diagram depicting a technique for generating and managing passwords, according to an embodiment of the invention. Generating and managing passwords can be performed entirely without user interaction. In FIG. 2, storage security module 102 generates a first password in step 202. Storage security module 102 stores the first password at a first location password location #1 114 in nonvolatile storage 108 that is separate from storage 110 in step 204.

In step 206, in response to receiving a first request to access data in the storage, storage security module 102 generates and provides to storage 110 a second request to access the data. The request might come from an application executing on a host system that has storage security module 102 installed. For example, the application might be a user interface on a printer, and a user has indicated, through the user interface, to print out a document currently stored in a printer queue that is part of the printer. In some embodiments, the request comes from some software or hardware that is part of the host system. In other embodiments, the request comes from some software or hardware that is not part of the host system. For example, the request might be received over a network from a computer, in order to retrieve a document stored in storage 110.

Storage access module 106 generates the second request to access the data by analyzing the request to access data in the storage. Storage access module 106 might calculate a location of the data in storage 110. In some embodiments, storage access module 106 might prepare the second request in one or more message packets, ready to be sent over a network to storage 110. In other embodiments, storage access module 106 might prepare to send an electrical signal that represents a request to access data in storage 110, with an address representing the location of the data in storage 110.

Storage security module 102 receives, from storage 110, a request for a password in step 208. In response to the request for the password: storage security module 102 retrieves, from nonvolatile storage 108 that is separate from storage 110, a first password in step 210, and storage security module 102 also provides the first password to storage 110 to obtain access to the data in storage 110 in step 210.

Accessing Storage (Normal Security Mode)

Figure 3:
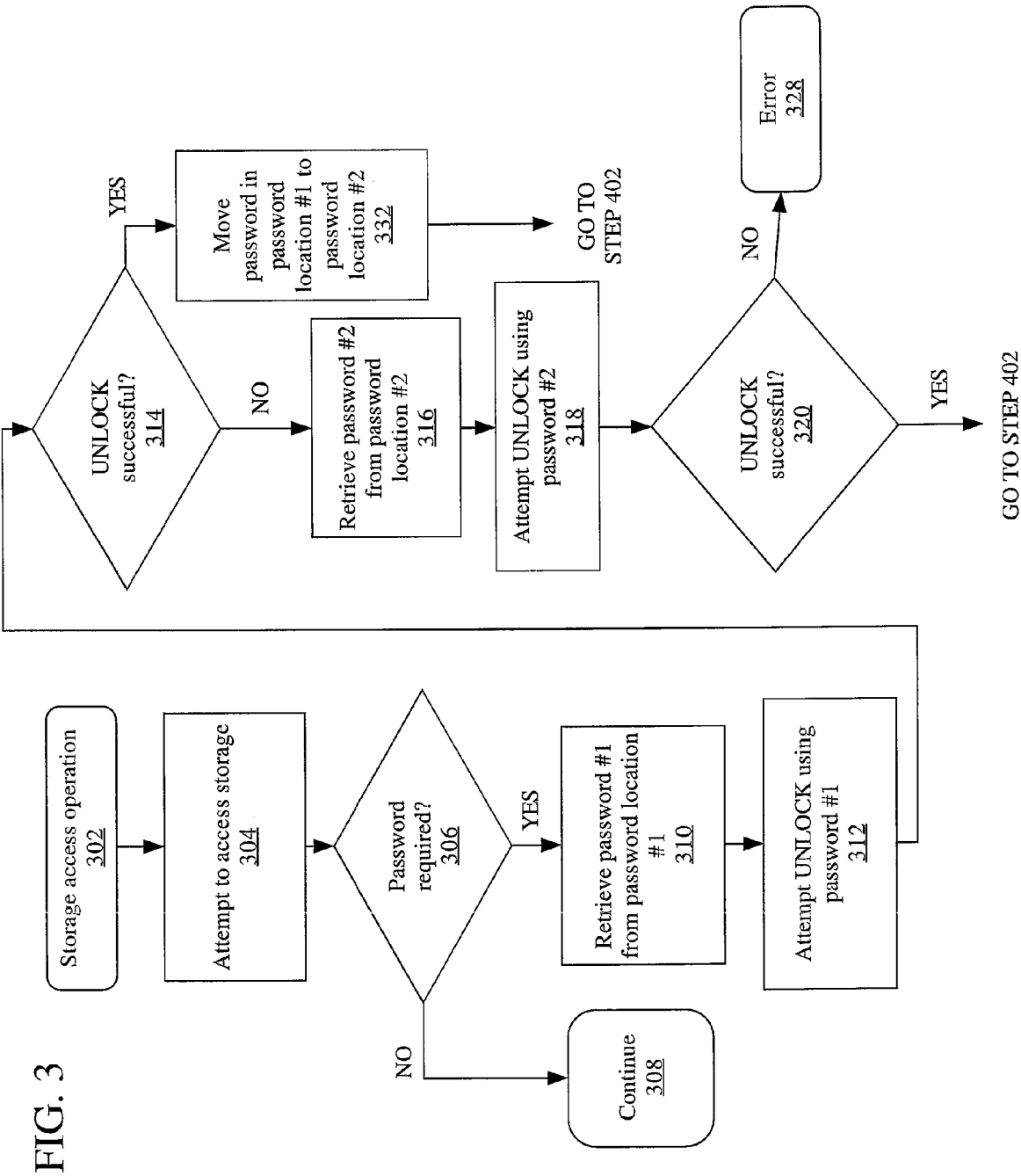
FIG. 3 is a flow diagram depicting a technique for unlocking a storage that is set to a NORMAL security mode, according to an embodiment of the invention.

FIG. 3 is a flow diagram depicting a technique for unlocking a storage that is set to a NORMAL security mode, according to an embodiment of the invention. In certain embodiments, the steps of FIG. 3 may be performed in a different order than that depicted in FIG. 3. Once storage 110 is unlocked, storage access module 106 can access storage 110 without needing to provide an access password to storage 110, until an event occurs that causes storage 110 to be locked again. Events that may cause storage 110 to lock again include power cycling (i.e. power off and then on) of the host system, a specified amount of time has passed, or the removal of storage 110 from host system 100. In some embodiments, some other events may cause storage 110 to lock again after having been unlocked. In some embodiments, the steps in FIG. 3 might be performed when storage 110 is powered up or when storage 110 is connected to host system 100.

In step 302, host system 100 initiates an operation to access storage 110, such as a read or write (or an operation that includes both read and write) to storage 110. In step 304, storage access module 106 attempts to access storage 110. In step 306, storage access module 106 determines whether an access password is required to access storage 110. For example, storage access module 106 may check if storage 110 requests a password.

If an access password is not required to access storage 110, storage access module 106 accesses storage 110 to perform the read or write operation, then storage access module 106 returns data from the read operation, or returns a confirmation of a successful writing operation. In some embodiments, storage access module 106 returns both read data and a writing confirmation. Storage access module 106 is then finished processing in step 308.

If an access password is required to access storage 110, storage access module 106 retrieves a password (i.e. password #1) from password location #1 114 in step 310. In some embodiments, passwords used to access storage 110 are specific to standards other than the ATA standard.

In step 312, storage access module 106 attempts to unlock storage 110 using the password read from password location #1 114. Storage access module 106 provides the password read from password location #1 114 to storage 110. In step 314, storage access module 106 determines whether the unlock attempt was successful. In some embodiments, if the unlock attempt was successful, storage access module 106 moves the password in password location #1 114 to password location #2 116 in step 332. Processing then continues according to FIG. 4. In other embodiments, if the unlock attempt was successful, processing continues at step 410, where storage access module 106 attempts to access storage 110. In some embodiments, storage 110 also uses the password read from password location #1 114 to decrypt data read in storage 110. If the unlock attempt was unsuccessful, storage access module 106 retrieves password #2 from password location #2 116 in step 316.

In step 318, storage access module 106 attempts to unlock storage 110 using password #2. In step 320, storage access module 106 determines whether the attempt at unlock using password #2 was successful. If successful, processing continues according to FIG. 4.

If unsuccessful, storage access module 106 returns an error message in step 328. The user may specify that storage access module 106 perform a recovery operation according to FIG. 9. In some embodiments, as part of step 328, storage access module 106 automatically performs a recovery operation as according to FIG. 9. In some embodiments, host system 100 or storage security module 102 may request that storage access module 106 perform the recovery operation as according to FIG. 9.

Figure 9:
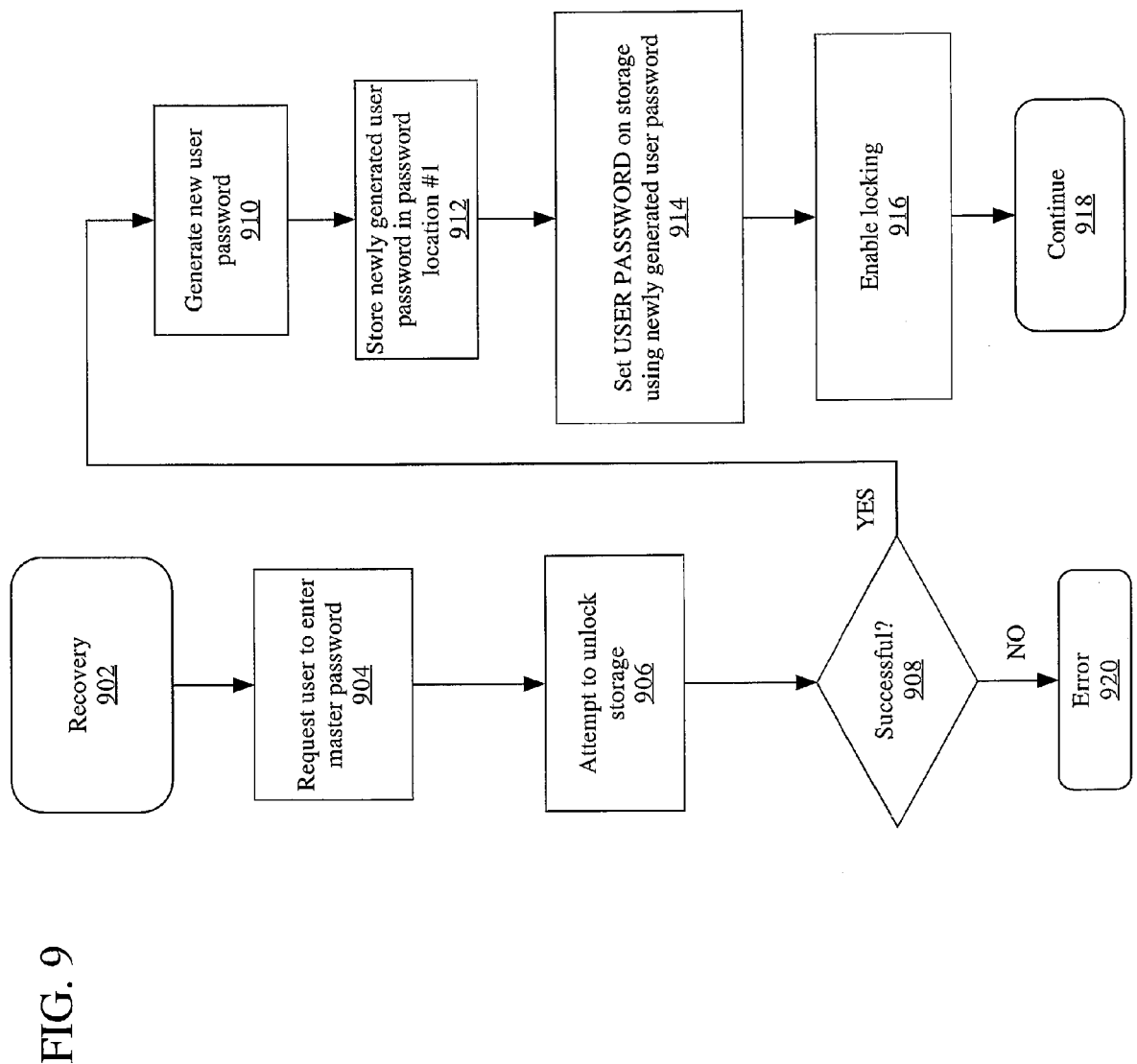
FIG. 9 is a flow diagram depicting a technique for recovery of a storage in NORMAL security mode, according to an embodiment of the invention.

In some embodiments, storage access module 106 might receive a message, at any time, to perform the recovery operation according to FIG. 9. The message to perform the recovery operation might be received from host system 100. In some embodiments, a user or an administrator will specify to host system 100 to perform the recovery operation of FIG. 10.

Figure 4:
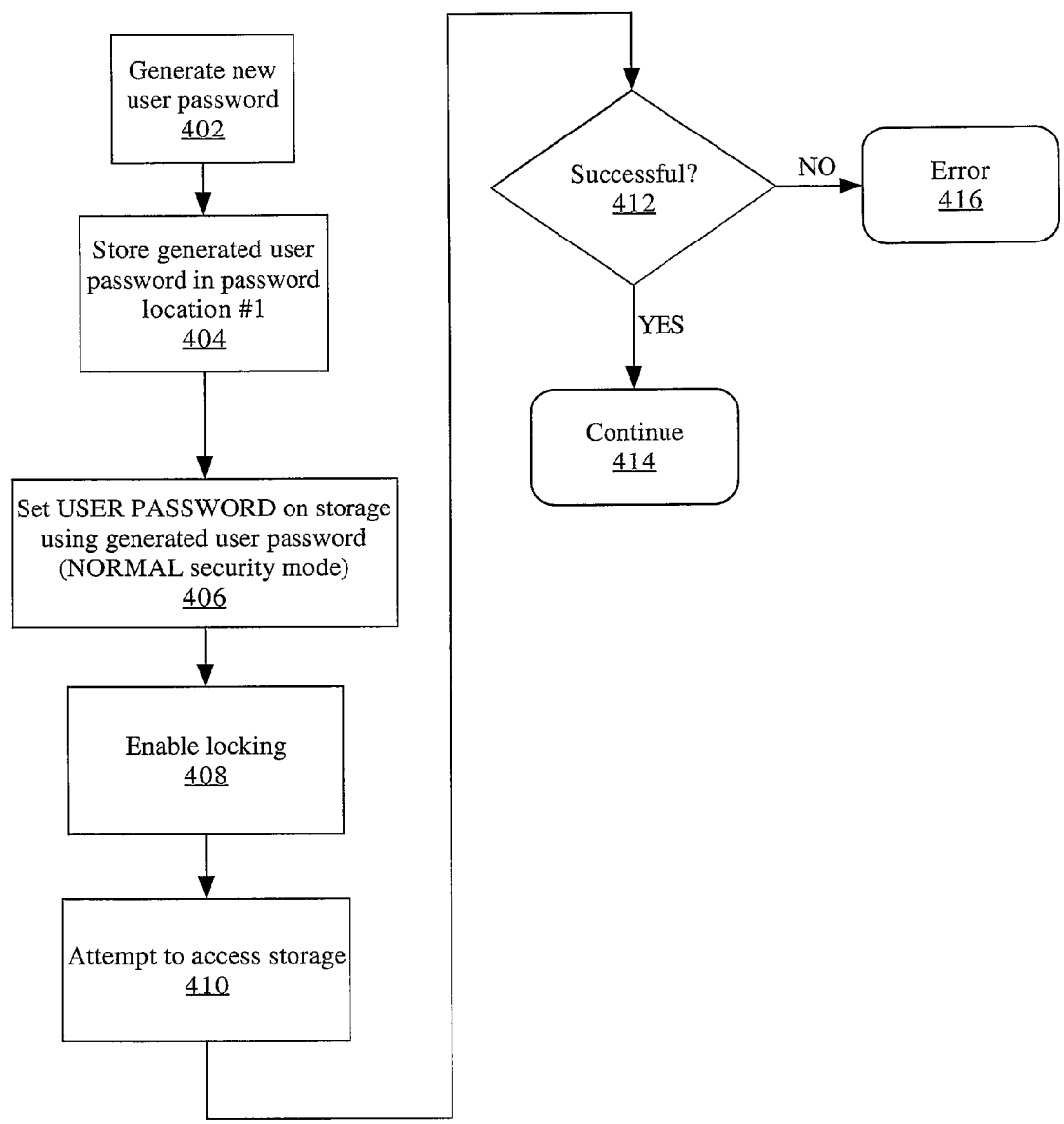
FIG. 4 is a flow diagram that continues the flow diagram of FIG. 3, which depicts a technique for unlocking a storage that is set to a NORMAL security mode.

FIG. 4 is a flow diagram that continues the flow diagram of FIG. 3, which depicts a technique for unlocking a storage that is set to a NORMAL security mode, according to an embodiment of the invention. In certain embodiments, the steps of FIG. 4 may be performed in a different order than that depicted in FIG. 4. In FIG. 4, storage access module 106 automatically generates a new user password in step 402. In step 404, storage access module 106 stores the newly generated user password in password location #1 114. In step 406, storage access module 106 sets USER PASSWORD on storage 110 using the newly generated user password. Under the ATA standard, USER PASSWORD would be known as ATA USER PASSWORD. Throughout this specification, reference to USER PASSWORD would be a reference to ATA USER PASSWORD for an implementation under the ATA standard. Storage access module 106 may confirm that storage 110 is set in NORMAL security mode.

In step 408, storage access module 106 enables locking on storage 110. In step 410, storage access module 106 attempts to access storage 110. In step 412, storage access module 106 determines whether the attempt to access storage 110 was successful. If successful, processing by storage access module 106 is finished in step 414. In some embodiments, as part of step 414, storage access module 106 either returns data read from storage 110 or provides some confirmation that a writing operation to storage 110 was successful, or both. If unsuccessful, storage access module 106 returns an error message in step 416. In some embodiments, storage 110 might implement a standard other than the ATA standard, which might change the terminology of ATA USER PASSWORD, HIGH SECURITY, MAX SECURITY, and SECURITY FREEZE LOCK to some other terminology specific to another standard.

Accessing Storage (Maximum Security Mode)

Figure 5:
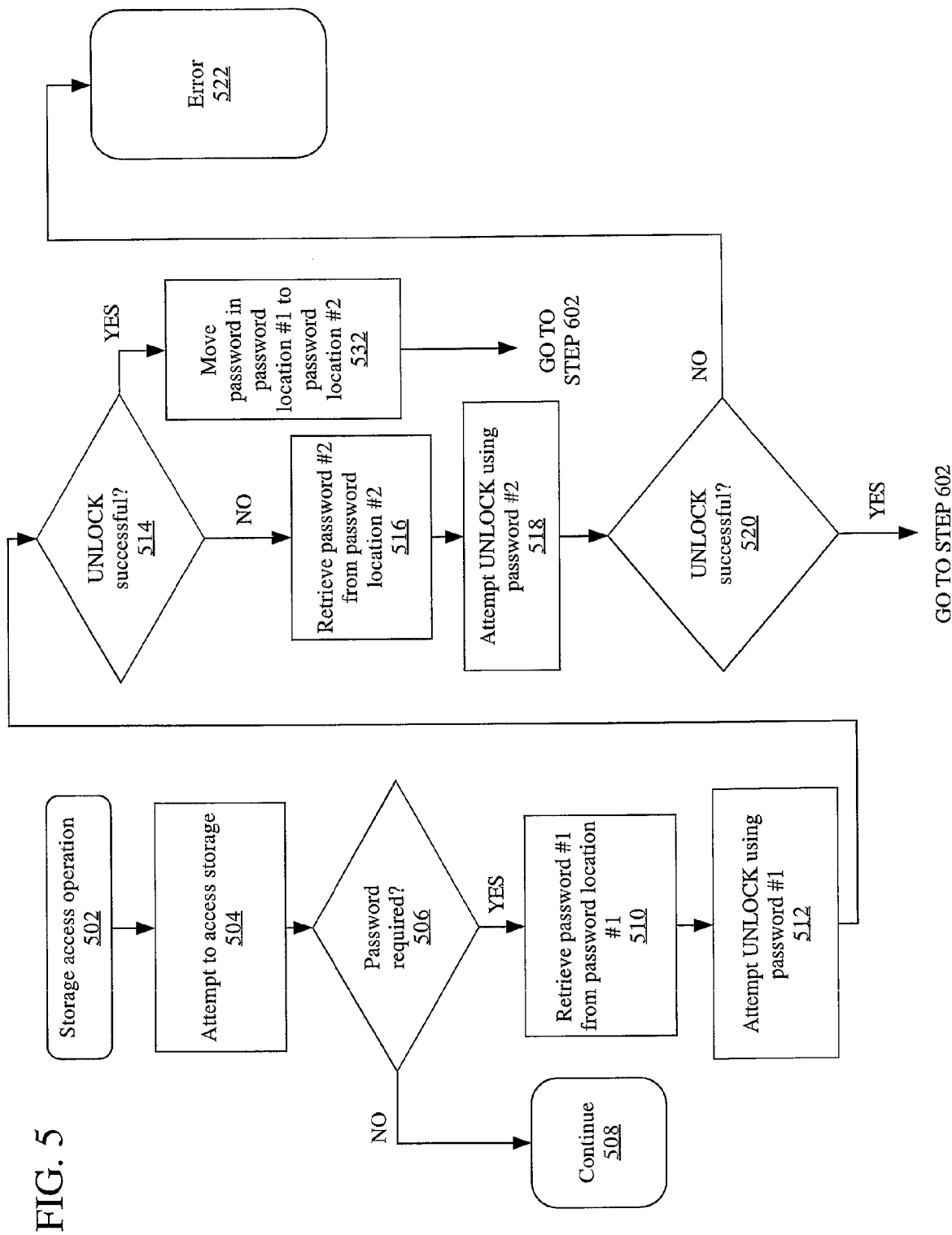
FIG. 5 is a flow diagram depicting a technique for unlocking a storage that is set to a MAXIMUM security mode, according to an embodiment of the invention.

FIG. 5 is a flow diagram depicting a technique for unlocking a storage that is set to a MAXIMUM security mode, according to an embodiment of the invention. In certain embodiments, the steps of FIG. 5 may be performed in a different order than that depicted in FIG. 5. Once storage 110 is unlocked, storage access module 106 can access storage 110 without needing to provide an access password to storage 110, until an event occurs that causes storage 110 to be locked again. Events that may cause storage 110 to lock again include power cycling of the host system, a specified amount of time has passed, or the removal of storage 110 from host system 100. In some embodiments, some other events may cause storage 110 to lock again after having been unlocked. In some embodiments, the steps in FIG. 3 might be performed when storage 110 is powered up or when storage 110 is connected to host system 100.

In step 502, host system 100 initiates an operation to access storage 110, such as a read or write (or an operation that includes both read and write) to storage 110. In step 504, storage access module 106 attempts to access storage 110. In step 506, storage access module 106 determines whether an access password is required to access storage 110. For example, storage access module 106 may check if storage 110 requests a password.

If an access password is not required to access storage 110, storage access module 106 accesses storage 110 to perform the read or write operation, then storage access module 106 returns data from the read operation, or returns a confirmation of a successful writing operation. In some embodiments, storage access module 106 returns both read data and a writing confirmation. Storage access module 106 is then finished processing in step 508.

If an access password is required to access storage 110, storage access module 106 retrieves a password (i.e. password #1) from password location #1 114 in step 510. In some embodiments, passwords used to access storage 110 are specific to standards other than the ATA standard.

In step 512, storage access module 106 attempts to unlock storage 110 using the password read from password location #1 114. Storage access module 106 provides the password read from password location #1 114 to storage 110. In step 514, storage access module 106 determines whether the unlock attempt was successful. In some embodiments, if the unlock attempt was successful, storage access module 106 moves the password in password location #1 114 to password location #2 116 in step 532. Processing then continues according to FIG. 6. In other embodiments, if the unlock attempt was successful, processing continues at step 610, where storage access module 106 attempts to access storage 110. In some embodiments, storage 110 also uses the password read from password location #1 114 to decrypt data read in storage 110. If the unlock attempt was unsuccessful, storage access module 106 retrieves password #2 from password location #2 116 in step 516.

In step 518, storage access module 106 attempts to unlock storage 110 using password #2. In step 520, storage access module 106 determines whether the attempt at unlock using password #2 was successful. If successful, processing continues according to FIG. 6.

If unsuccessful, storage access module 106 returns an error message in step 522. The user may specify that storage access module 106 perform a recovery operation according to FIG. 10. In some embodiments, as part of step 522, storage access module 106 automatically performs a recovery operation as according to FIG. 10. In some embodiments, host system 100 or storage security module 102 may request that storage access module 106 perform the recovery operation as according to FIG. 10.

Figure 10:
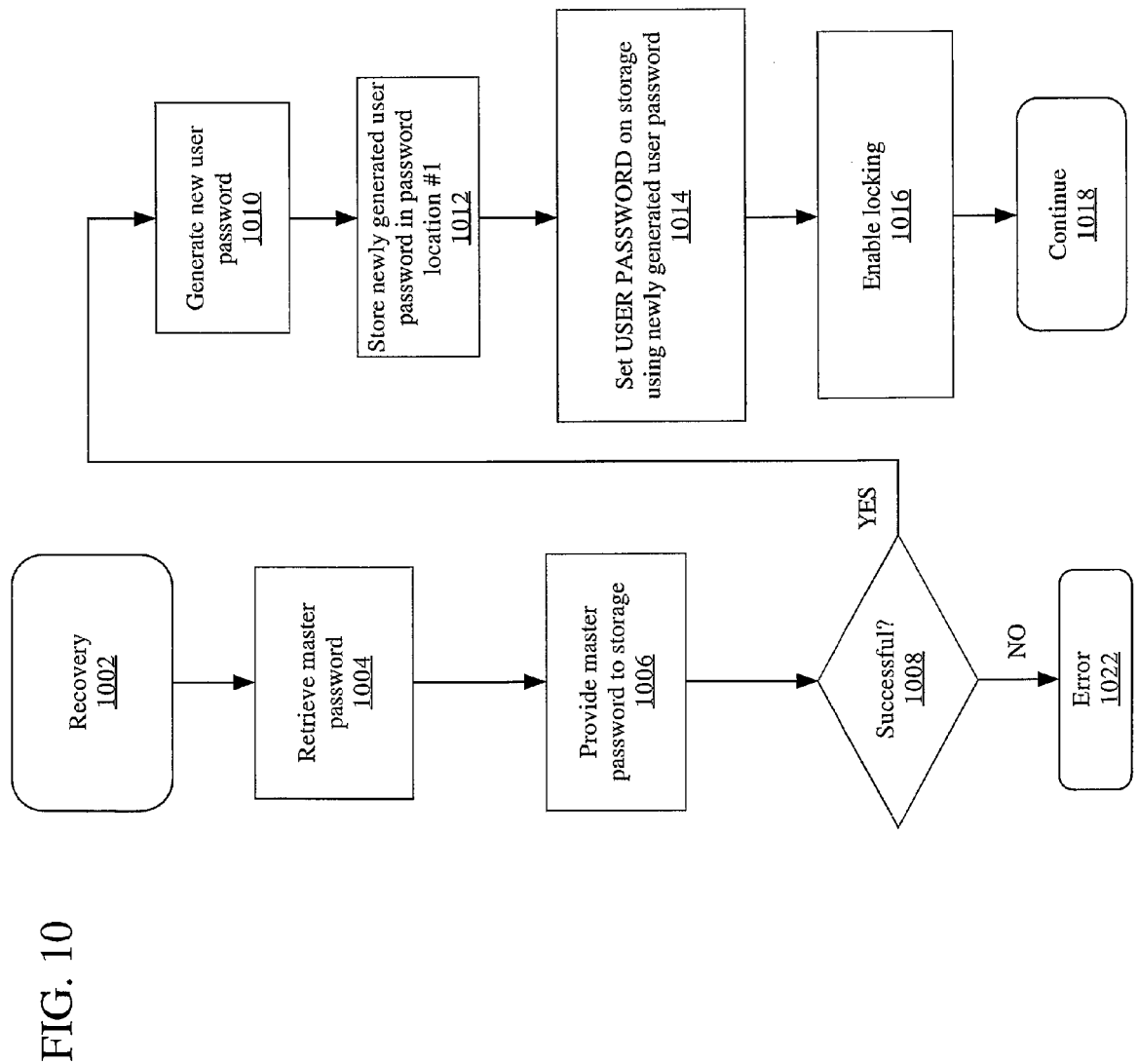
FIG. 10 is a flow diagram depicting a technique for recovery of a storage in MAXIMUM security mode, according to an embodiment of the invention.

In some embodiments, storage access module 106 might receive a message, at any time, to perform the recovery operation according to FIG. 10. The message to perform the recovery operation might be received from host system 100. In some embodiments, a user or an administrator will specify to host system 100 to perform the recovery operation of FIG. 10.

Figure 6:
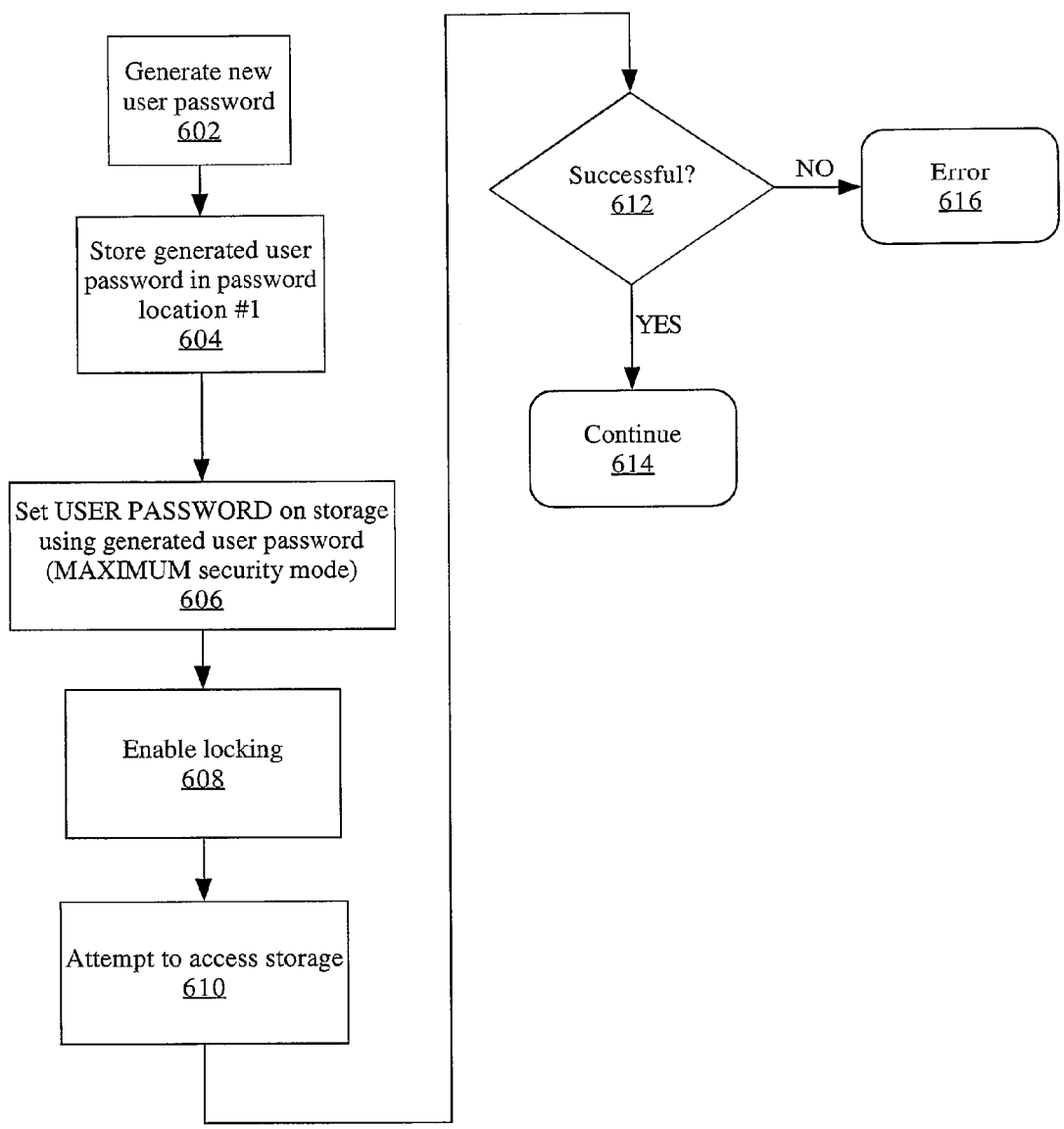
FIG. 6 is a flow diagram that continues the flow diagram of FIG. 5, which depicts a technique for unlocking a storage that is set to a MAXIMUM security mode.

FIG. 6 is a flow diagram that continues the flow diagram of FIG. 5, which depicts a technique for unlocking a storage that is set to a MAXIMUM security mode, according to an embodiment of the invention. In certain embodiments, the steps of FIG. 6 may be performed in a different order than that depicted in FIG. 6. In FIG. 6, storage access module 106 automatically generates a new user password in step 602. In step 604, storage access module 106 stores the newly generated user password in password location #1 114. In step 606, storage access module 106 sets USER PASSWORD on storage 110 using the newly generated user password, assuming storage 110 is set in MAXIMUM security mode. Storage access module 106 may confirm that storage 110 is set in MAXIMUM security mode.

In step 608, storage access module 106 enables locking on storage 110. In step 610, storage access module 106 attempts to access storage 110. In step 612, storage access module 106 determines whether the attempt to access storage 110 was successful. If successful, processing by storage access module 106 is finished in step 614. In some embodiments, as part of step 614, storage access module 106 either returns data read from storage 110 or provides some confirmation that a writing operation to storage 110 was successful, or both. If unsuccessful, storage access module 106 returns an error message in step 616. In some embodiments, storage 110 might implement a standard other than the ATA standard, which might replace the terminology of ATA USER PASSWORD, HIGH SECURITY, MAX SECURITY, and SECURITY FREEZE LOCK to some other terminology specific to another standard.

Initializing Storage (Normal Security Mode)

Figure 7:
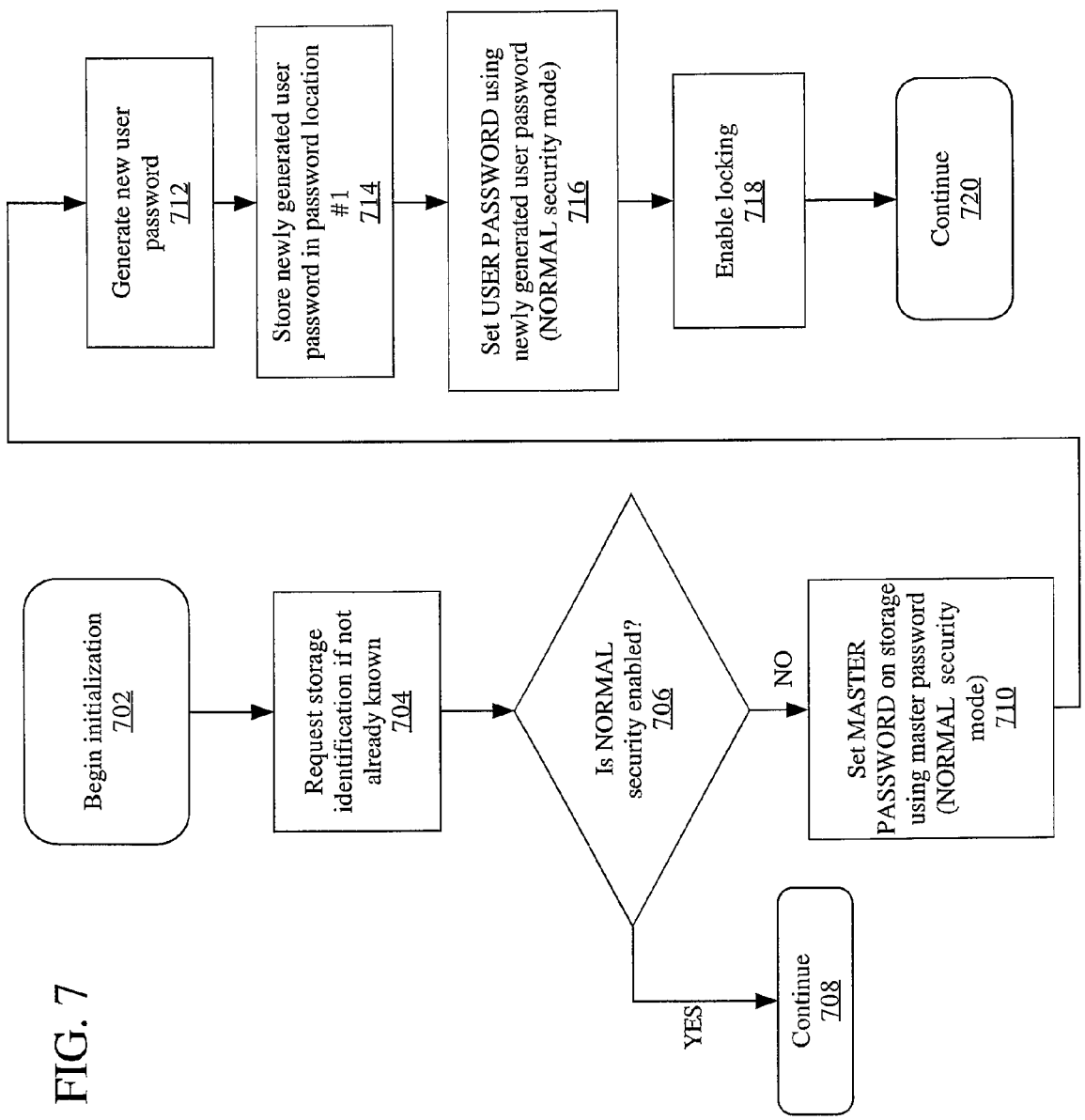
FIG. 7 is a flow diagram depicting a technique for initializing a storage that is set to a NORMAL security mode, according to an embodiment of the invention.

FIG. 7 is a flow diagram depicting a technique for initializing a storage, according to an embodiment of the invention.

Storage access module 106 performs the steps in FIG. 7 anytime storage 110 needs initialization. For example, initialization might be performed when host system 100 is a brand-new system that is powered on for the first time, or when storage 110 is a storage that has never been installed in host system 100. In some embodiments, initialization is performed at a factory that produces host system 100, such as where host system 100 is a printer or a multi-function peripheral. In some embodiments, storage 110 is a portable storage medium and storage access module 106 might initialize storage 110 when storage 110 is plugged into host system 100. In some embodiments, the user specifies to initialize storage 110. In some embodiments, storage access module 106 performs the steps in FIG. 7 at other times, and under other circumstances. In certain embodiments, the steps of FIG. 7 may be performed in a different order than that depicted in FIG. 7.

In FIG. 7, storage 110 begins initialization in step 702. In step 704, initialization module 104 requests identification information from storage 110 if the identity of storage 110 is not already known. For example, initialization module 104 sends the ATA "Identify Device" command to storage 110. In some embodiments, initialization module 104 sends an identify device command to storage 110 according to some storage interface standard other than the ATA standard. In certain embodiments, initialization module 104 identifies storage 110 by examining the hardware configuration of storage 110. Such hardware configuration might include the communication channel or controller of host system 100 that the storage 110 is connected to. In some embodiments, storage 110 provides a unique identifier, such as a serial number, to initialization module 104. Generally, storage access module 106 can use the identification of storage 110 to retrieve the access password to access content stored in storage 110. In some embodiments, initialization module 104 requests identification information from storage 110 prior to generating a user password for use with storage 110.

In step 706, initialization module 104 checks if storage 110 is set for NORMAL security mode. For example, according to the ATA standard, initialization module 104 will check if HIGH SECURITY is enabled on storage 110 (where HIGH SECURITY under the ATA standard is NORMAL security mode), by checking whether "SECURITY MODE" is enabled. If storage 110 is set for NORMAL security mode, initialization module 104 is finished processing in step 708.

In step 710, if storage 110 is not set for NORMAL security, initialization module 104 sets the master password setting on storage 110 using a master password. Under the ATA standard, initialization module 104 sets an ATA MASTER PASSWORD setting on storage 110. The master password might be a vendor password. Initialization module 104 sets the master password setting on storage 110 by providing the master password to storage 110. In some embodiments, storage 110 then stores the master password as a unique password that will uniquely allow access to all stored data in storage 110. In some embodiments, the master password only allows access to some of the data stored in storage 110.

In some embodiments, the master password is retrieved from non-volatile memory 108. The master password might have been stored at non-volatile memory 108 by a vendor, an administrator, or a user. In some embodiments, the master password is retrieved from a second storage that is neither storage 110 nor non-volatile memory 108. In some embodiments, a system administrator determines the master password. In some embodiments, the master password is obtained over a network.

In some embodiments, initialization module 104 sets storage 110 to NORMAL security mode at step 710, in response to determining that storage 110 is not already set at NORMAL security mode. In other embodiments, initialization module 104 sets storage 110 to NORMAL security mode at some other time.

In step 712, initialization module 104 generates a new user password. In step 714, initialization module 104 stores the newly generated user password in password location #1 114. In step 716, initialization module 104 sets a user password in storage 110 (referred to herein as USER PASSWORD), using the new user password that was generated, by providing the new user password to storage 110. For example, according to the ATA standard, initialization module 104 sets ATA USER PASSWORD setting on storage 110 using the newly generated password.

In step 718, initialization module 104 enables locking of storage 110 so that, upon an attempt to access storage 110, storage 110 will require an access password prior to providing access to storage 110. In some embodiments, initialization module 104 might enable locking of storage 110 when initialization module 104 detects power cycling (i.e. power off and then on) of host system 100, or reset of host system 100.

The access password setting on storage 110 is the USER PASSWORD, and under the ATA standard is known as ATA USER PASSWORD. Once the USER PASSWORD is set on storage 110, storage 110 requires that any entity requesting access to content stored in storage 110 provide USER PASSWORD to storage 110, prior to allowing that entity to access the content stored in storage 110. However, if the entity cannot provide USER PASSWORD to storage 110, storage 110 may accept a master password, as described elsewhere in this specification.

A request to access storage 110 might include, among other things, reading or writing to storage 110. In some embodiments, other requests also require a password to access storage 110, such as request to erase content on storage 110. In some embodiments, the requests for which a password is required to access storage 110 can be custom configured.

In step 720, initialization module 104 is finished processing.

Initializing Storage (Maximum Security Mode)

Figure 8:
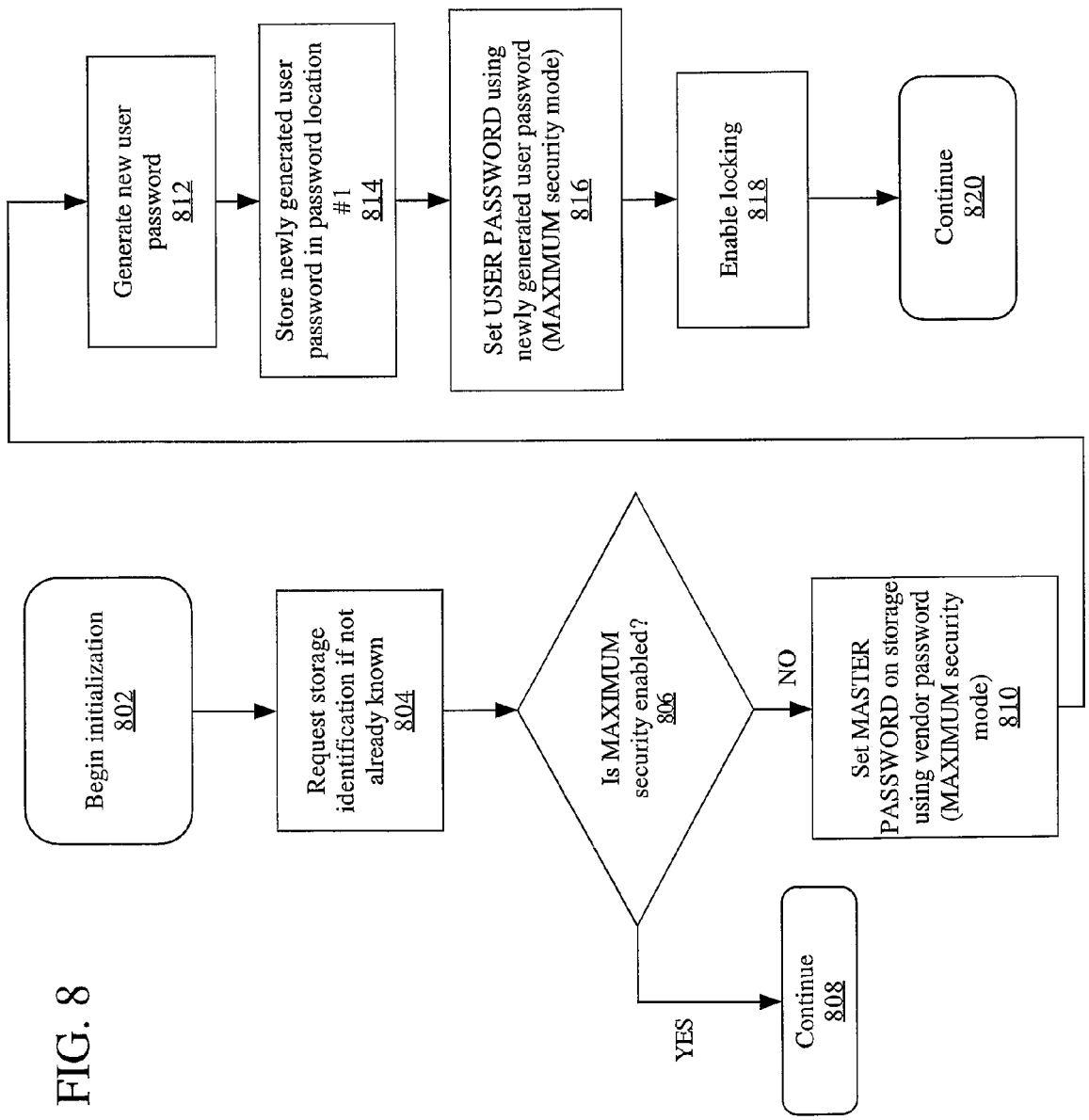
FIG. 8 is a flow diagram depicting a technique for initializing a storage that is set to a MAXIMUM security mode, according to an embodiment of the invention.

FIG. 8 is a flow diagram depicting a technique for initializing a storage, according to an embodiment of the invention. Storage access module 106 performs the steps in FIG. 8 anytime storage 110 needs initialization. For example, initialization might be performed when host system 100 is a brand-new system that is powered on for the first time, or when storage 110 is a storage that has never been installed in host system 100. In some embodiments, initialization is performed at a factory that produces host system 100, such as where host system 100 is a printer or a multi-function peripheral. In some embodiments, storage 110 is a portable storage medium and storage access module 106 might initialize storage 110 when storage 110 is plugged into host system 100. In some embodiments, the user specifies to initialize storage 110. In some embodiments, initialization module 104 performs the steps in FIG. 8 at other times, and under other circumstances. In certain embodiments, the steps of FIG. 8 may be performed in a different order than that depicted in FIG. 8.

In FIG. 8, storage 110 begins initialization in step 802. In step 804, initialization module 104 requests identification information from storage 110 if the identity of storage 110 is not already known. For example, initialization module 104 sends the ATA "Identify Device" command to storage 110. In some embodiments, initialization module 104 sends an identify device command to storage 110 according to some storage interface standard other than the ATA standard. In certain embodiments, initialization module 104 identifies storage 110 by examining the hardware configuration of storage 110. Such hardware configuration might include the communication channel or controller of host system 100 that the storage 110 is connected to. In some embodiments, storage 110 provides a unique identifier, such as a serial number, to initialization module 104. Generally, storage access module 106 can use the identification of storage 110 to retrieve the access password to access content stored in storage 110. In some embodiments, initialization module 104 requests identification information from storage 110 prior to generating a user password for use with storage 110.

In step 806, initialization module 104 checks if storage 110 is set for MAXIMUM security mode. For example, according to the ATA standard, initialization module 104 will check if MAX SECURITY is enabled on storage 110 (where MAX SECURITY under the ATA standard is MAXIMUM security mode), by checking whether "SET MAX" is enabled. If storage 110 is set for MAXIMUM security mode, initialization module 104 is finished processing in step 808.

In step 810, if storage 110 is not set for MAXIMUM security, initialization module 104 sets the master password setting on storage 110 using a master password. Under the ATA standard, initialization module 104 sets an ATA MASTER PASSWORD setting on storage 110 using the master password. This master password might be a vendor password, i.e. provided by a vendor. Initialization module 104 sets the master password setting on storage 110 by providing the master password to storage 110. In some embodiments, storage 110 then stores the master password as a unique password that will uniquely allow erasure of all stored data in storage 110. In some embodiments, the master password only allows erasure of some of the data stored in storage 110.

In some embodiments, the vendor password is stored at and read from non-volatile memory 108. The vendor password might be provided by a manufacturer of storage 110, possibly in a web page. The vendor password might be found in a lookup table. In some embodiments, the master password might have been stored at non-volatile memory 108 by a vendor, an administrator, or a user. In some embodiments, the master password is retrieved from a second storage that is neither storage 110 nor non-volatile memory 108. In some embodiments, a system administrator determines the master password. In some embodiments, the master password is obtained over a network.

In some embodiments, initialization module 104 sets storage 110 to MAXIMUM security mode at step 810, in response to determining that storage 110 is not already set at MAXIMUM security mode. In other embodiments, initialization module 104 sets storage 110 to MAXIMUM security mode at some other time.

In step 812, initialization module 104 generates a new user password. In step 814, initialization module 104 stores the newly generated user password in password location #1 114. In step 816, initialization module 104 sets a user password in storage 110 (referred to herein as USER PASSWORD), using the new user password that was generated, by providing the new user password to storage 110. For example, according to the ATA standard, initialization module 104 sets ATA USER PASSWORD setting on storage 110 using the newly generated password.

In step 818, initialization module 104 enables locking of storage 110 so that, upon an attempt to access storage 110, storage 110 will require the access password prior to providing access to storage 110. In some embodiments, initialization module 104 might enable locking of storage 110 when initialization module 104 detects power cycling (i.e. power off and then on) of host system 100, or reset of host system 100.

The access password setting on storage 110 is the USER PASSWORD, and under the ATA standard is known as ATA USER PASSWORD. Once the USER PASSWORD is set on storage 110, storage 110 requires that any entity requesting access to content stored in storage 110 provide USER PASSWORD to storage 110, prior to allowing that entity to access the content stored in storage 110. However, if the entity cannot provide USER PASSWORD to storage 110, storage 110 may accept a master password to allow a limited set of functionality, as described elsewhere in this specification.

A request to access storage 110 might include, among other things, reading or writing to storage 110. In some embodiments, other requests also require a password to access storage 110. In some embodiments, the requests for which a password is required to access storage 110 can be custom configured.

In step 820, initialization module 104 is finished processing.

Recovery

In an embodiment of the invention, recovery procedures and outcomes depend on whether the host system has implemented NORMAL security mode or MAXIMUM security mode. If the host system has implemented NORMAL security mode, users may recover data stored in storage 110 despite losing the user password, if the user can make available a master password to the storage security module 102. In some embodiments, the user makes available the master password to storage access module 106. In certain embodiments, the user makes available the master password to storage 110.

If the host system is set for MAXIMUM security and the user has lost the user password, the user may not recover the contents of storage 110, but storage access module 106 will provide a master password to storage 110, which will allow erasure of the contents of storage 110 as a security measure. In some embodiments, storage security module 102 provides the master password to storage 110. Storage access module 106 may cause all of the contents of storage 110 to be erased in response to receiving the master password. In certain embodiments, not all of the contents of storage 110 will be erased, but only a specific portion of the contents of storage 110 will be erased Recovery (Normal Security Mode)

FIG. 9 is a flow diagram depicting a technique for recovery of a storage in NORMAL security mode, according to an embodiment of the invention. In a host system that has implemented NORMAL security mode, the effect of recovery is to unlock storage 110, generate, store, and set a new password, and enable locking. In certain embodiments, the steps of FIG. 9 may be performed in a different order than that depicted in FIG. 9.

In FIG. 9, the recovery process begins at step 902. In step 904, storage access module 106 requests the user to enter a master password. This master password is a password provided by, for example, a network administrator. In some embodiments, entities other than the network administrator may have made available the master password. In some embodiments, the master password is stored somewhere other than non-volatile memory 108, such as a removable portable storage device. In step 906, storage access module 106 attempts to unlock storage 110 to obtain access to data in storage 110 by providing, to storage 110, the master password.

In step 908, storage access module 106 determines whether storage 110 successfully accepted the master password for unlocking storage 110. If not successful, storage access module 106 returns error in step 920. If successful, storage 110 will grant the user access to contents of storage 110. Storage access module 106 generates a new user password in step 910. In step 912, storage access module 106 stores the generated user password in password location #1 114. In step 914, storage access module 106 sets USER PASSWORD on storage 110 using the newly generated user password. In step 916, storage access module 106 enables locking on storage 110. In step 918, processing by storage access module 106 is finished.

Recovery (Maximum Security Mode)

FIG. 10 is a flow diagram depicting a technique for recovery of a storage in MAXIMUM security mode, according to an embodiment of the invention. In a host system that has implemented MAXIMUM security mode, the effect of recovery is to erase contents of storage 110, generate, store, and set a new password, and enable locking. In certain embodiments, the steps of FIG. 10 may be performed in a different order than that depicted in FIG. 10.

Under MAXIMUM security mode, the master password can only be used for erasing contents of storage 110. For MAXIMUM security mode, the master password is a vendor password provided by a vendor of storage 110. In some embodiments, the master password can only be used to erase specific partial contents of storage 110. In some embodiments, the master password is not from a vendor but is a custom password. In some embodiments, entities other than the vendor of storage 110 may have made available the master password.

In FIG. 10, the recovery process begins at step 1002. In step 1004, storage access module 106 retrieves master password from non-volatile memory 108. In some embodiments, the master password is stored somewhere other than non-volatile memory 108. For example, in such embodiments, the master password may be stored in a removable portable storage device, or the master password may be automatically retrieved from a vendor website without requiring any user interaction. In step 1006, storage access module 106 provides master password to storage 110. In some embodiments, storage access module 106 provides master password to storage 110 to erase all stored data in storage 110. In some embodiments, providing the master password to storage 110 will only allow erasure of some data in storage 110, and not erasure of all data in storage 110.

In step 1008, storage access module 106 determines whether storage 110 successfully processed the master password. If not successful, storage access module 106 returns error in step 1022. If successful, storage 110 will erase the contents of storage 110. After erasing the contents of storage 110, storage access module 106 generates a new user password in step 1010. In step 1012, storage access module 106 stores the generated user password in password location #1 114. In step 1014, storage access module 106 sets USER PASSWORD on storage 110 using the newly generated user password. In step 1016, storage access module 106 enables locking on storage 110. In step 1018, processing by storage access module 106 is finished.

Implementation Mechanisms

Figure 11:
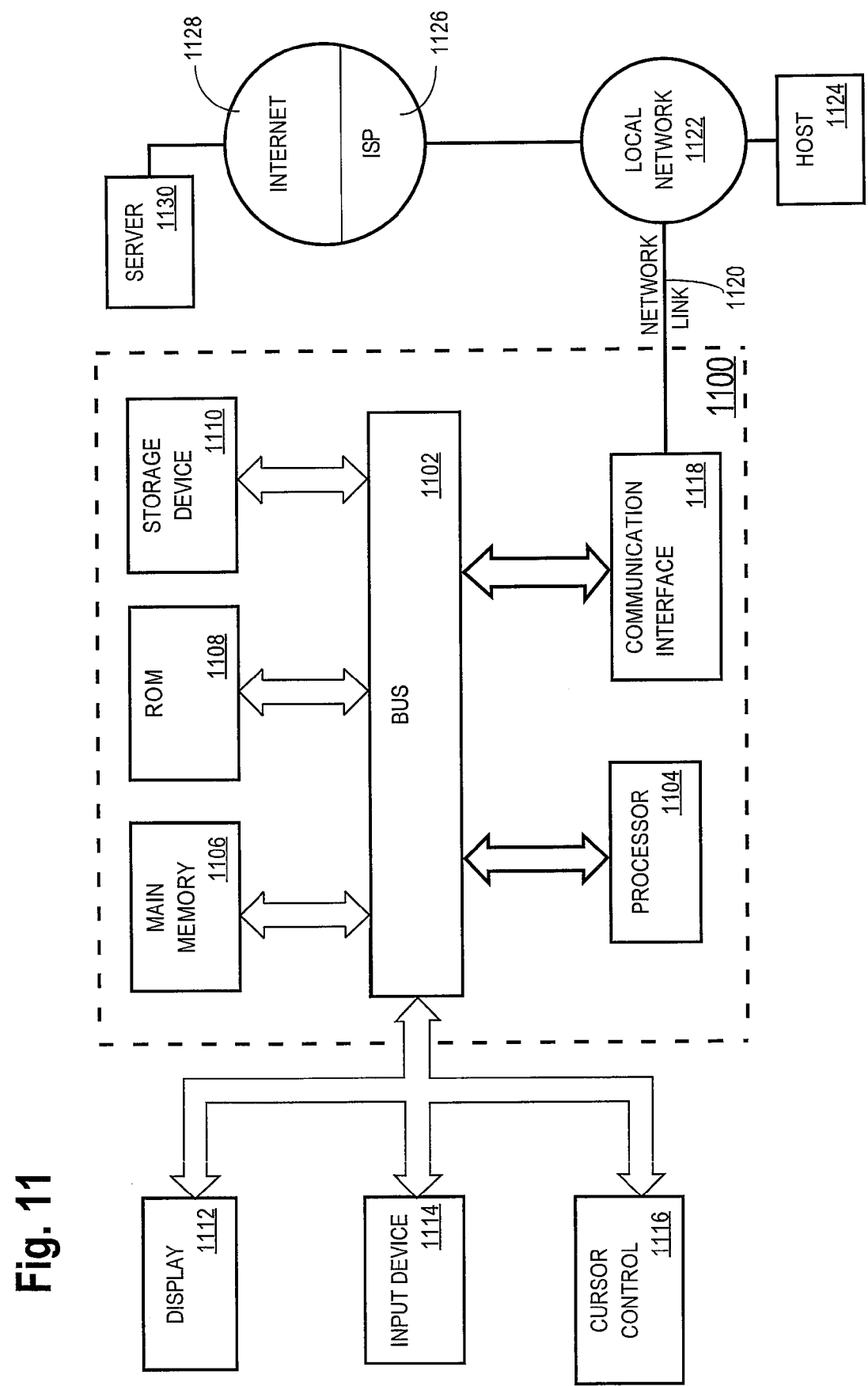
FIG. 11 is a block diagram depicting a computer system on which embodiments of the invention may be implemented.

FIG. 11 is a block diagram that depicts a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage coupled to bus 1102 for storing static information and instructions for processor 1104. A storage 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another computer-readable medium, such as storage 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using computer system 1100, various computer-readable media are involved, for example, in providing instructions to processor 1104 for execution. Such a medium may take many forms, including but not limited to storage media and transmission media. Storage media includes both non-volatile media and volatile media. Non-volatile media includes, for example, optical or magnetic disks, such as storage 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage 1110, or other non-volatile storage for later execution. In this manner, computer system 1100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for managing passwords for accessing data in a storage, comprising:
    one or more processors;
    an initialization module configured to:
        generate a first password, and
        store the first password at a first location in a nonvolatile storage that is separate from the storage; and
    a storage access module configured to:
        generate and provide to the storage a second request to access data, in response to receiving a first request to access the data in the storage;
        receive, from the storage, a request for a password,
        retrieve, from the nonvolatile storage that is separate from the storage, the first password, in response to the request for the password,
        provide the first password to the storage to obtain access to the data in the storage,
        in response to successful access to the data in the storage using the first password:
            cause the first password to be stored at a second location in the nonvolatile storage, wherein the second location in the nonvolatile storage is different than the first location in the nonvolatile storage,
            cause a second password that is different than the first password to be generated and stored in the first location in the nonvolatile storage in place of the first password,
        in response to receiving from the storage, subsequent to the request for a password, a second request for a password, retrieving the second password from the first location in the nonvolatile storage and providing the second password to the storage to obtain access to the data in the storage, and
        in response to unsuccessful access to the data in the storage using the second password retrieved from the first location in the nonvolatile storage, retrieving the first password from the second location in the nonvolatile storage and providing the first password to the storage to obtain access to the data in the storage.

2. The apparatus of claim 1, wherein a single module includes both the initialization module and the storage module.

3. The apparatus of claim 1, the apparatus being further configured to:
    in response to unsuccessful access to the data in the storage using the first password:
        retrieve a third password from the second location in the nonvolatile storage, and provide the third password to the storage to obtain access to the data in the storage.

4. The apparatus of claim 3, the apparatus being further configured to:
in response to unsuccessful access to the data in the storage using the third password:
if a current security mode for the storage is set to a normal security mode, then providing a master password to the storage to allow access to data in the storage, and
if a current security mode for the storage is set to a maximum security mode, then preventing access to the data in the storage and providing a master password to the storage to cause the data to be deleted from the storage.

5. The apparatus of claim 1, the apparatus being further configured to provide a vendor password to the storage to erase all stored data in the storage.

6. The apparatus of claim 1, the apparatus being further configured to:
request identification from the storage prior to generating the first password;
determine that a maximum security mode has not been enabled for the storage;
set a security mode of the storage to the maximum security mode, in response to determining that the maximum security mode has not been enabled for the storage.

7. The apparatus of claim 1, the apparatus being further configured to:
enable locking of the storage so that, after locking, and upon a new request to access the storage, the storage will require an access password prior to providing access to the storage.

8. The apparatus of claim 1, the apparatus being further configured to:
set a security mode of the storage to normal security mode.

9. The apparatus of claim 1, the apparatus being further configured to:
retrieve a vendor password from a second storage; and
provide the vendor password to the storage;
wherein the storage stores the vendor password as a unique password that will uniquely allow erasure of all stored data in the storage.

10. A non-transitory computer-readable storage medium storing instructions for managing passwords for accessing data in a storage, wherein processing of the instructions by one or more processors causes:
generating a first password;
storing the first password at a first location in a nonvolatile storage that is separate from the storage;
in response to receiving a first request to access data in the storage, generating and providing to the storage a second request to access the data;
receiving, from the storage, a request for a password; and
in response to the request for the password:
retrieving, from the nonvolatile storage that is separate from the storage, the first password, and
providing the first password to the storage to obtain access to the data in the storage,
in response to successful access to the data in the storage using the first password:
causing the first password to be stored at a second location in the nonvolatile storage, wherein the second location in the nonvolatile storage is different than the first location in the nonvolatile storage,
causing a second password that is different than the first password to be generated and stored in the first location in the nonvolatile storage in place of the first password,
in response to receiving from the storage, subsequent to the request for a password, a second request for a password, retrieving the second password from the first location in the nonvolatile storage and providing the second password to the storage to obtain access to the data in the storage, and
in response to unsuccessful access to the data in the storage using the second password retrieved from the first location in the nonvolatile storage, retrieving the first password from the second location in the nonvolatile storage and providing the first password to the storage to obtain access to the data in the storage.

11. The non-transitory computer-readable storage medium of claim 10, further storing additional instructions that, when processed by the one or more processors, causes:
if providing the first password to the storage does not successfully obtain access to the data in the storage, then retrieving a second password from a second location on the nonvolatile storage; and
providing the second password to the storage to obtain access to the data in the storage.

12. The non-transitory computer-readable storage medium of claim 10, further storing additional instructions that, when processed by the one or more processors, causes:
in response to unsuccessful access to the data in the storage using the first password:
retrieve a third password from the second location in the nonvolatile storage, and
provide the third password to the storage to obtain access to the data in the storage.

13. The non-transitory computer-readable storage medium of claim 10, further storing additional instructions which, when processed by the one or more processors, causes:
in response to unsuccessful access to the data in the storage using the third password:
if a current security mode for the storage is set to a normal security mode, then providing a master password to the storage to allow access to data in the storage, and
if a current security mode for the storage is set to a maximum security mode, then preventing access to the data in the storage and providing a master password to the storage to cause the data to be deleted from the storage.

14. The non-transitory computer-readable storage medium of claim 10, further storing additional instructions which, when processed by the one or more processors, causes:
requesting, from a user, a master password; and
providing the master password to the storage to obtain access to the data in the storage.

15. The non-transitory computer-readable storage medium of claim 10, further storing additional instructions which, when processed by the one or more processors, causes:
prior to generating the first password, requesting identification from the storage;
determining that a maximum security mode has not been enabled for the storage;
in response to determining that the maximum security mode has not been enabled for the storage,
setting a security mode of the storage to the maximum security mode.

16. The non-transitory computer-readable storage medium of claim 10, further storing additional instructions which, when processed by the one or more processors, causes:

setting a security mode of the storage to normal security mode.

17. The non-transitory computer-readable storage medium of claim 10, further storing additional instructions which, when processed by the one or more processors, causes:
  enabling locking of the storage so that, after locking, and upon a new request to access the storage, the storage will require an access password prior to providing access to the storage.

18. The non-transitory computer-readable storage medium of claim 10, further storing additional instructions which, when processed by the one or more processors, causes:
  providing a master password to the storage;
  wherein the storage stores the master password as a unique password that allows access to all stored data in the storage.

19. A computer-implemented method for managing passwords for accessing data in a storage, the computer-implemented method comprising:
  generating a first password;
  storing the first password at a first location in a nonvolatile storage that is separate from the storage;
  in response to receiving a first request to access data in the storage, generating and providing to the storage a second request to access the data;
  receiving, from the storage, a request for a password; and
  in response to the request for the password:
    retrieving, from the nonvolatile storage that is separate from the storage, the first password, and
    providing the first password to the storage to obtain access to the data in the storage,
  in response to successful access to the data in the storage using the first password:
    causing the first password to be stored at a second location in the nonvolatile storage, wherein the second location in the nonvolatile storage is different than the first location in the nonvolatile storage,
    causing a second password that is different than the first password to be generated and stored in the first location in the nonvolatile storage in place of the first password,
  in response to receiving from the storage, subsequent to the request for a password, a second request for a password, retrieving the second password from the first location in the nonvolatile storage and providing the second password to the storage to obtain access to the data in the storage, and
  in response to unsuccessful access to the data in the storage using the second password retrieved from the first location in the nonvolatile storage, retrieving the first password from the second location in the nonvolatile storage and providing the first password to the storage to obtain access to the data in the storage.

20. The computer-implemented method of claim 19, further comprising:
  retrieving a vendor password from a second storage; and
  providing the vendor password to the storage;
  wherein the storage stores the vendor password as a unique password that will uniquely allow erasure of all stored data in the storage.

* * * * *